United States Patent [19]

Pedain et al.

[11] Patent Number: 5,294,665
[45] Date of Patent: Mar. 15, 1994

[54] WATER SOLUBLE OR WATER DISPERSIBLE POLYISOCYANATE MIXTURES AND THEIR USE IN STOVING COMPOSITIONS

[75] Inventors: Josef Pedain, Köln; Heino Müller; Dieter Mager, both of Leverkusen; Harald Blum, Wachtendonk; Holger Casselmann, Bergisch Gladbach, all of Fed. Rep. of Germany

[73] Assignee: Bayer Aktiengesellschaft, Leverkusen, Fed. Rep. of Germany

[21] Appl. No.: 82,224

[22] Filed: Jun. 24, 1993

[30] Foreign Application Priority Data

Jul. 3, 1992 [DE] Fed. Rep. of Germany ....... 4221924

[51] Int. Cl.$^5$ .............................................. C08G 18/80
[52] U.S. Cl. ..................................... 524/591; 524/839; 524/840; 528/45; 528/49; 528/71; 252/182.2
[58] Field of Search ....................... 524/591, 839, 840; 528/45, 49, 71; 252/182.2

[56] References Cited

U.S. PATENT DOCUMENTS

| | | | |
|---|---|---|---|
| 4,098,933 | 7/1978 | Burkhardt et al. | 427/379 |
| 4,119,602 | 10/1978 | Isqur et al. | 260/29.6 NR |
| 4,284,544 | 8/1981 | Wegner et al. | 260/29.2 TN |
| 4,433,017 | 2/1984 | Goto et al. | 528/45 |
| 4,433,095 | 2/1984 | Hombach et al. | 524/563 |
| 4,925,885 | 5/1990 | Rosthauser et al. | 528/45 |
| 5,098,983 | 3/1992 | Mosbach et al. | 528/59 |

FOREIGN PATENT DOCUMENTS

| | | |
|---|---|---|
| 424697 | 5/1991 | European Pat. Off. . |
| 2708611 | 5/1978 | Fed. Rep. of Germany . |
| 1444933 | 8/1976 | United Kingdom . |

Primary Examiner—Maurice J. Welsh
Attorney, Agent, or Firm—Joseph C. Gil; Thomas W. Roy

[57] ABSTRACT

The present invention relates to a polyisocyanate mixture which has blocked isocyanate groups and an average NCO-functionality, based on reversibly blocked isocyanate groups, of 2.0 to 2.6, and is the reaction product, converted into the salt form by the at least partial neutralization of the incorporated carboxyl groups, of i) at least one organic diisocyanate having a molecular weight of 168 to 300 with
ii) at least one monofunctional blocking agent for isocyanate groups,
iii) at least one monobasic or dibasic hydroxycarboxylic acid,
iv) 1 to 15 wt. %, based on the weight of component i), of at least one dihydric to hexahydric alcohol having a molecular weight of 62 to 182 and
v) 50 to 500 wt. %, based on the weight of component i), of at least one diol having a molecular weight of 350 to 950 and containing ester groups.

The present invention also relates to the use of this polyisocyanate mixture in combination with water dispersible or water soluble polyhydroxyl compounds for the production of aqueous stoving lacquers.

12 Claims, No Drawings

WATER SOLUBLE OR WATER DISPERSIBLE POLYISOCYANATE MIXTURES AND THEIR USE IN STOVING COMPOSITIONS

BACKGROUND OF THE INVENTION

1. Field of the Invention

This invention relates to water soluble or water dispersible, urethane-modified polyisocyanate mixtures having blocked isocyanate groups, to their use in combination with water soluble or water dispersible polyhydroxyl compounds in stoving lacquers and to such an aqueous stoving lacquer.

2. Description of the Prior Art

In recent years, the significance of aqueous lacquers and coating compositions has greatly increased due to ever stricter emission guidelines concerning the solvents released after lacquer application. Although aqueous lacquer systems are already available for many applications, these systems often still cannot achieve the high levels of quality of conventional lacquers containing solvents in terms of resistance to solvents and chemicals or in terms of elasticity and resistance to mechanical stress. In particular, no polyurethane-based coating compositions which may be applied from the aqueous phase are known which fulfil the high practical demands placed on elastic fillers for coating motor vehicle bodywork in terms of impact resistance, resistance to stone impact and resistance to water and chemicals.

This statement applies both to GB-PS 1,444,933, EP-A-0,061,628 and DE-AS 2,359,613, which are directed to the hydrophilic modification of aromatic polyisocyanates; to DE-OS 4,001,783, which is directed to special anionically modified aliphatic polyisocyanates; and to the systems disclosed in DE-OS 2,456,469, DE-OS 2,814,815, EP-A-0,012,348 and EP-A-0,424,697, which are directed to aqueous stoving binders based on blocked polyisocyanates and organic polyhydroxyl compounds. The systems based on polyurethane prepolymers containing carboxyl groups with capped isocyanate groups according to DE-OS 2,708,611 or the highly functional (and therefore largely unsuitable for the production of elastic coatings), blocked, water-soluble urethane prepolymers according to DE-OS 3,234,590 are also largely unusable for the stated purpose.

Stoving lacquers, particularly stoving fillers, which optimally fulfil the previously stated requirements and which may be applied from the aqueous phase may successfully be produced when the polyisocyanate mixtures according to the invention and described below in more detail are used as hardeners for the water dispersible or water soluble polyhydroxyl compounds. Particularly good results are achieved when these polyisocyanate mixtures are combined with certain urethane-modified polyester resins, which are also described below in more detail, to form one-component binder compositions which may be applied from the aqueous phase.

SUMMARY OF THE INVENTION

The present invention relates to a polyisocyanate mixture which has blocked isocyanate groups and an average NCO-functionality, based on reversibly blocked isocyanate groups, of 2.0 to 2.6, and is the reaction product, converted into the salt form by the at least partial neutralization of the incorporated carboxyl groups, of i) at least one organic diisocyanate having a molecular weight of 168 to 300 with ii) at least one monofunctional blocking agent for isocyanate groups, iii) at least one monobasic or dibasic hydroxycarboxylic acid, iv) 1 to 15 wt. %, based on the weight of component i), of at least one dihydric to hexahydric alcohol having a molecular weight of 62 to 182 and v) 50 to 500 wt. %, based on the weight of component i), of at least one diol having a molecular weight of 350 to 950 and containing ester groups.

The present invention also relates to the use of this polyisocyanate mixture in combination with water dispersible or water soluble polyhydroxyl compounds for the production of aqueous stoving lacquers.

The present invention further relates to an aqueous stoving lacquer, wherein the binder contains a mixture of a) a urethane-modified polyester resin which has an acid number of 12 to 30, a hydroxyl number of 30 to 130 and a solvent content below 5.5 wt. % and is produced by the reaction of a1) 81 to 92 wt. % of a polyester polyol which has a hydroxyl number of 80 to 210 and an acid number of ≦5, and is the condensation product of a1.1) 35 to 50 mol % of one or more diprimary diols having a molecular weight of 62 to 150, a1.2) 1 to 7 mol % of one or more primary/secondary diols having a molecular weight of 76 to 286, a1.3) 36 to 50 mol % of one or more dicarboxylic acids having a molecular weight of 98 to 600, a1.4) 4 to 14 mol % of one or more triols having a molecular weight of 92 to 134 and a1.5) 0 to 4 wt. % of one or more monocarboxylic acids having a molecular weight of 122 to 280, a2) 3 to 6.5 wt. % of a bis(hydroxymethyl)alkanecarboxylic acid, a3) 0 to 5 wt. % of a low molecular weight diol or triol having a molecular weight of 62 to 150 and a4) 7 to 14.5 wt. % of a polyisocyanate component, at least 60% of which is a linear aliphatic polyisocyanate having a molecular weight of 168 to 1000, wherein said reaction product is prepared in an at least 90% organic solution followed by conversion of at least 75% of the carboxyl groups into carboxylate groups and dispersion in water, and b) the previously described water dispersible or water soluble blocked polyisocyanates.

DETAILED DESCRIPTION OF THE INVENTION

Qualitative and quantitative selection of the starting materials used to produce the polyisocyanate mixtures according to the invention is of essential significance to the invention. Particular attention must be paid to precisely defined mixture ratios of polyfunctional and difunctional constituents and to the use of diols containing ester groups v) with a precisely defined molecular weight. Proper selection permits the production of coating compositions and coatings prepared therefrom having seemingly contradictory properties, i.e., good stability of the coating composition in water, in particular good compatibility of the individual components with themselves and water, while also obtaining coatings with excellent water resistance together with excellent flexibility (impact resistance) and simultaneously a high crosslink density (solvent resistance).

Diisocyanate component i) is selected from organic diisocyanates having a molecular weight of 168 to 300. Suitable examples include both aromatic and (cyclo)aliphatic diisocyanates such as 1,6-diisocyanatohexane, 2,4- and/or 2,6-diisocyanato-toluene, 4,4'-diisocyanatodiphenylmethane, 4,4'-diisocyanato-dicyclohexylmethane, 1-isocyanato-3,3,5-trimethyl-5-isocyanatomethyl-cyclohexane (IPDI) and mixtures thereof.

Monofunctional blocking agents ii) are known and include ε-caprolactam, malonic acid diethyl ester, acetoacetic acid ethyl ester or oximes. Butaneoxime is the preferred blocking agent.

Monobasic and dibasic hydroxycarboxylic acids iii) include 2-hydroxyacetic acid, 3-hydroxypropanoic acid and 12-hydroxy-9-octadecanoic acid (ricinoleic acid). Preferred carboxylic acids are those in which the reactivity of the carboxyl group is hindered by stearic effects. 3-hydroxy-2,2-dimethylpropanoic acid (hydroxypivalic acid) and dimethylolpropionic acid are particularly preferred.

Suitable dihydric to hexahydric alcohols iv), which have a molecular weight of 62 to 182 and do not contain ester groups, are selected from 1,2-ethanediol, 1,2- and 1,3-propanediol, 1,4-, 1,2- or 2,3-butanediol, 1,6-hexanediol, 1,4-dihydroxycyclohexane, glycerol, trimethylolethane, trimethylolpropane, pentaerythritol and sorbitol.

Polyester diol component v) is selected from diols having a molecular weight of 350 to 950 and containing ester groups. This is the average molecular weight which may be calculated from the hydroxyl number. In general, ester diols are mixtures in which a minor portion of the individual constituents may have a molecular weight below or above this range. These polyester diols are known and are prepared from diols and dicarboxylic acids. Suitable diols include 1,4-dimethylolcyclohexane and the diols previously described for component iv).

Suitable dicarboxylic acids include aromatic dicarboxylic acids such as phthalic acid, isophthalic acid and terephthalic acid; cycloaliphatic dicarboxylic acids such as hexahydrophthalic acid, tetrahydrophthalic acid, endomethylenetetrahydrophthalic acid and the anhydrides thereof; and aliphatic dicarboxylic acids, which are preferred, such as succinic acid, glutaric acid, adipic acid, suberic acid, azelaic acid, sebacic acid and the anhydrides thereof. Polyester diols prepared from adipic acid are preferably used as at least a portion of component v).

More preferred polyester diols are the known polycaprolactone diols which are produced in a manner from the previously described diols as starter molecules and ε-caprolactone. The preferred starter molecule is 1,6-hexanediol. Most preferred are polycaprolactone diols which have been produced by the polymerization of c-caprolactone using 1,6-hexanediol as starter and which have a very narrow oligomer distribution. This distribution may be achieved by using boron trifluoride etherate or organotin compounds as catalyst during polymerization. These most preferred ester diols contain at least 50 wt. % of molecules having a molecular weight of 460 to 802.

In order to produce the polyisocyanate mixtures according to the invention, starting components iii) to v) are generally mixed together and reacted with diisocyanate component i). A small quantity of a suitable inert solvent may optionally be used. The temperature of the reaction mixture is maintained at 0° C. to 120° C., preferably 20° C. to 60° C. if aromatic diisocyanates are used and 80° to 110° C. if (cyclo)aliphatic diisocyanates are used. The blocking agent is then added and the temperature during the reaction is preferably maintained at less than 120° C.

In the production of the polyisocyanate mixtures, the amount of the starting component i) and the amounts of starting components iii) to v) are selected such that an excess of NCO remains, which is then reacted with the blocking agent. The blocking agent is generally used in a slight excess, i.e., up to 1.1 moles of blocking agent per mole of isocyanate groups which are still present after the reaction of diisocyanate component i) with the hydroxyl groups of components iii) to v) or which may theoretically be expected to be present after completion of this reaction.

The stated sequence of reactions is not critical and may be changed. For example, the hydroxycarboxylic acid iii) may be reacted at the very end under the mildest possible conditions in order to prevent the carboxyl groups from also reacting with the NCO groups. In this instance the reactants are preferably selected such that for each hydroxyl group of component iii) there is at least one NCO group available. However, this requirement is not mandatory. For example, when a polyhydroxycarboxylic acid is used as component iii), it is not essential that all of its hydroxyl groups react with isocyanate groups. In this extreme case, it would be sufficient if one mole of isocyanate groups was available for each mole of polyhydroxycarboxylic acid iii).

The polyisocyanate mixture may be prepared without solvent or, as already mentioned, in an inert solvent. After the reaction, neutralization and absorption in water the solvent may optionally be removed by distillation. Suitable solvents are those which are not reactive with NCO groups. Examples include ketones such as acetone and methyl ethyl ketone; esters such as ethyl acetate; and also higher boiling solvents, such as N-methylpyrrolidone, which may remain in the coating composition as a flow-control agent. The solvents remaining in the coating composition are used, if at all, in quantities of up to 20 wt. %, based on the weight of starting materials i) to v).

On completion of the reaction and before the addition of water, the COOH groups present are at least partially neutralized with a neutralizing agent. Alkali or alkaline earth hydroxides may be used for neutralization, but preferably tertiary amines are used such as triethylamine or, more preferably, N,N-dimethylethanolamine are used.

It is essential to the invention that the starting materials and their amounts are selected such that water soluble or water dispersible urethane-modified polyisocyanate mixtures are ultimately obtained, which have a statistical average of 2.0 to 2.6 blocked isocyanate groups per molecule, which corresponds to a blocked isocyanate group content (calculated as NCO) of approximately 2 to 8 wt. %.

The condition of dispersibility or solubility in water is generally fulfilled if amount of the hydroxycarboxylic acid iii) and the degree of neutralization of the incorporated carboxyl groups is calculated such that the polyisocyanate mixtures have a carboxylate group content of 15 to 120, preferably 25 to 75 milliequivalents per 100 g of solids.

In the production of the polyisocyanate mixtures according to the invention the polyols iv) are generally used in an amount of 1 to 15, preferably 2 to 8 wt. %, based on the weight of diisocyanate component i).

The quantity of the ester diol component v) is generally 50 to 500, preferably 60 to 300 wt. %, based on the weight of the diisocyanate component i).

On completion of neutralization, the polyisocyanate mixtures according to the invention are generally converted into 20 to 50 wt. % aqueous dispersions or solutions by the addition of water. It is also possible to produce such dispersions or solutions by stirring an unneutralized polyisocyanate mixture or a solution thereof into an aqueous solution of the neutralizing agent. In general, finely-divided, practically transparent dispersions or solutions of the polyisocyanate mixtures according to the invention are obtained. If solvents are present, they may be removed from the aqueous phase, for example, under reduced pressure and at elevated temperature. As previously discussed, small amounts of certain solvents may remain in the dispersion or solution.

The polyisocyanate mixtures according to the invention are combined with aqueous solutions or dispersions of organic polyhydroxyl compounds to provide aqueous one-component binders which are stable in storage. These binder compositions contain organic polyhydroxyl compounds a) dissolved or dispersed in water and contain polyisocyanate mixtures b) dissolved or dispersed in water.

The mixing ratio of the two components a) and b) is generally selected such that the equivalent ratio of blocked isocyanate groups to hydroxyl groups is 0.5:1 to 1.5:1, preferably 0.7:1 to 1.1:1.

Binder component a) is selected from known water dispersible or water soluble polyhydroxyl compounds which have an average molecular weight (which may be calculated from the hydroxyl group content and hydroxyl functionality) of 1000 to 100,000, preferably 2000 to 10,000 a content of hydrophilic groups (preferably polyether chains having ethylene oxide units and/or carboxylate groups) sufficient for their solubility or dispersibility in water. It is also possible to use polyhydroxyl compounds which are not sufficiently hydrophilic to remain stably dispersed in water in combination with external emulsifiers.

Polyhydroxy polyesters, polyhydroxy polyethers and other polymers having hydroxyl groups, e.g., polyhydroxy polyacrylates are suitable for use as component a). The compounds generally have a hydroxyl number of 20 to 200, preferably 50 to 130, based on solids.

The polyhydroxyl polyacrylates are known copolymers of styrene with simple esters of acrylic acid or methacrylic acid which contain at least a portion of hydroxyalkyl esters (such as the 2-hydroxyethyl esters, 2-hydroxypropyl esters, and 2-, 3- or 4-hydroxybutyl esters) of these acids in order to introduce the hydroxyl groups.

Suitable polyether polyols include the known ethoxylation and/or propoxylation products suitable divalent to tetravalent starter molecules such as water, ethylene glycol, propanediol, trimethylolpropane, glycerol and/or pentaerythritol.

Examples of suitable polyester polyors include the known reaction products of polycarboxylic acids or polycarboxylic acid anhydrides, preferably dicarboxylic acids or dicarboxylic acid anhydrides, with excess quantities of polyhydric alcohols, e.g., the alkane polyols described for the preparation of the polyether polyols. Suitable polycarboxylic acids or polycarboxylic acid anhydrides include adipic acid, phthalic acid, isophthalic acid, phthalic anhydride, tetrahydrophthalic anhydride, hexahydrophthalic anhydride, maleic acid, maleic anhydride, their Diels-Alder adducts with cyclopentadiene, fumaric acid and dimeric or trimeric fatty acids. To prepare the polyester polyols, mixtures of the polyhydric alcohols and/or mixtures of the acids or acid anhydrides may be used.

The polyester polyors may be prepared in known manner as described, for example, in Houben-Weyl, Methoden der organischen Chemie, volume XIV/2, G Thieme-Verlag, Stuttgart, 1963, pages 1 to 47.

The optional hydrophilic modification of these polyhydroxyl compounds proceeds by methods which are known per se, as are for example disclosed in EP-B-0,157,291 or EP-A-0,427,028 (U.S. Pat. No. 5,126,393, herein incorporated by reference). The water soluble or water dispersible, urethane-modified polyesters described in these prior publications are particularly suitable as component a). Also suitable, but less preferred, are the water soluble or water dispersible polyhydroxy polyacrylates described in DE-OS 3,829,587 (U.S. Pat. No. 5,075,370, herein incorporated by reference).

Particularly preferred as component a) are urethane-modified polyester resins which have acid numbers of 12 to 30 mg KOH/g, hydroxyl numbers of 30 to 130 mg KOH/g and a maximum solvent content of 5.5 wt. %, and which have been produced by the reaction of starting materials a1) to a4). The acid numbers both here and below include both the free carboxyl groups and the carboxyl groups converted into carboxylate groups by neutralization.

Particularly preferred such solutions or dispersions of urethane-modified polyester resins are those which have acid numbers of 12 to 26 and hydroxyl numbers of 30 to 130, which contain a maximum of 3.5% of organic solvents without a distillation stage and which have been produced by reacting a1) 83 to 89 wt. % of a polyester polyol having a hydroxyl number of 95 to 185 and an acid number of ±3.5, a2) 3.2 to 4.8 wt. % of a bis(hydroxymethyl)alkanecarboxylic acid, a3) 0 to 3 wt. % of a low molecular weight diol having a molecular weight of 62 to 150 and a4) 8.5 to 13 wt. % of a diisocyanate component, at least 80% of which is a linear aliphatic diisocyanate having a molecular weight of 168 to 300, in an at least 94% organic solution. After conversion of at least 75% of the carboxyl groups into carboxylate groups, the polyester resin is dispersed or dissolved in water. In these particularly preferred polyester resins, polyester polyols a1) are condensation products of a1.1) 39 to 46 mol % of diprimary diols having a molecular weight of 62 to 150, a1.2) 1.2 to 5 mol % of primary/secondary diols having a molecular weight of 76 to 286, a1.3) 38 to 48 mol % of dicarboxylic acids having a molecular weight of 98 to 560, a1.4) 5 to 12.5 mol % of triols having a molecular weight of 92 to 143 and a1.5) 0 to 1.9 wt. % of monocarboxylic acids having a molecular weight of 122 to 280.

Production of polyester resins a1) proceeds by the known reaction of the starting materials, e.g., according to the principle of melt condensation, optionally with application of a vacuum, at temperatures of 140° to 220° C. with elimination of water.

Starting component a1.1) is selected from diprimary diols having a molecular weight of 62 to 150. Examples include ethylene glycol, 1,6-hexanediol, 1,4-butanediol, neopentyl glycol, 1,4-cyclohexanedimethanol, 1,8-octanediol, diethylene glycol and mixtures of these and other diprimary diols.

Starting component a1.2) is selected from primary/secondary diols having a molecular weight of 76 to 286. Examples include 1,2-propylene glycol, 1,3-butanediol, 1,2-octanediol, and mixtures of these and other primary/secondary diols.

Starting component a1.3) is selected from dicarboxylic acids having a molecular weight of 98 to 600 or their anhydrides. Examples include maleic acid (anhydride), phthalic anhydride, isophthalic acid, hexahydrophthalic anhydride, tetrahydrophthalic anhydride, adipic acid, succinic acid, sebacic acid, dimer fatty acid or mixtures of these and also other dicarboxylic acids.

Starting component a1.4) is selected from triols having a molecular weight of 92 to 134. Examples include glycerol, 1,1,1-trimethylolpropane, 1,2,6-hexanetriol, 1,1,1-trimethylolethane and mixtures of these and other triols.

Starting component a1.5) is selected from monocarboxylic acids having a molecular weight of 122 to 280. Examples include 2-ethylhexanoic acid, isononanoic acid, octadecanoic acid, soya oil fatty acid, benzoic acid and mixtures of these and other monocarboxylic acids.

Component a2) is selected from bis(hydroxymethyl)alkanecarboxylic acids, preferably dimethylolpropionic acid.

Component a3) is selected from low molecular weight diols or triols having a molecular weight of 62 to 150. Examples include ethylene glycol, propylene glycol, hexanediol, neopentyl glycol, trimethylolpropane, 1,4-cyclohexane dimethanol and mixtures of these and other diols and/or triols.

Component a4) is at least one organic polyisocyanate having a molecular weight of 168 to 1000. Preferred are the (cyclo)aliphatic diisocyanates having a molecular weight of 168 to 300, which have previously been disclosed for the production of component i). Also suitable are any of the other known polyisocyanates of polyurethane chemistry, particularly lacquer polyisocyanates prepared from the (cyclo)aliphatic diisocyanates or also from aromatic diisocyanates such as 2,4- and/or 2,6-diisocyanatotoluene or 4,4'-diisocyanatodiphenyl methane. "Lacquer polyisocyanates" are modification products of the monomeric diisocyanates which contain urethane, allophanate, isocyanurate, uretdione and/or bioret groups.

The urethane-modified polyester resins a) which are preferably used as component a) are prepared by homogenizing polyester a1), bis(hydroxymethyl)alkane carboxylic acid a2), component a3) and the optional solvent, adding the diisocyanate component a4) at 50° to 130° C. and stirring the reaction mixture until there are no further NCO groups present. This reaction is performed in the presence of 0.005 to 1 wt. % of suitable catalysts, such as triethylamine, dibutyltin oxide or dibutyltin dilaurate. The reaction is carried out in at least a 90%, preferably a 94%, organic solution. Suitable solvents include N-methylpyrrolidone, N-methylcaprolactam and dimethyldiglycol.

After neutralizing at least 75%, preferably at least 95%, of the carboxyl groups, the binders are dispersed or dissolved in water. Neutralization may also carried out simultaneously with the dispersion or dissolving stages previously disclosed. Suitable neutralizing agents include triethylamine, dimethylaminoethanol, triethanolamine, methyldiethanolamine, diisopropanolamine, N-methylmorpholine, 2-amino-2-methyl-1-propanol, ammonia or mixtures of these and other neutralizing agents.

The urethane-modified polyester resins generally have a carboxylate group content of 20 to 55 milliequivalents per 100 g of solids.

In order to produce the ready-to-use coating compositions, the aqueous solutions or dispersions of components a) and b) are mixed together as previously described. The resulting one-component binders may generally be stored for any desired length of time. Known coatings may optionally be used such as pigments, flow-control agents, anti-blistering additives or catalysts. These additives may be added to the aqueous mixture of the binder components a) and b) or to the aqueous solutions or dispersions of the starting components a) and/or b) before they are mixed.

The one-component coating compositions containing the polyisocyanate mixtures according to the invention as hardener may be applied in single or multiple coats to any heat resistant substrate using any of the commonly used methods known from coatings technology such as spraying, brushing, dipping, flow coating or by means of rollers and coating knives.

Coatings are obtained for example on metal, plastics, wood or glass by curing the composition at 80° to 220° C., preferably at 130° to 180° C.

The binders according to the invention are suitable for the production of coatings on sheet steel, as is used, for example, for the production of vehicle body parts, machinery, casings, drums or containers. They are preferably used for the production of automotive fillers. The coatings generally have a dry layer thickness of 0.01 to 0.3 mm.

The binders according to the invention provide highly durable surface protection, as is demonstrated in the examples, particularly high impact resistance which makes the binders excellently suited for applications in which good protection from stone impact is necessary.

Another advantage of the novel aqueous binders is their high storage stability both at room temperature and at slightly elevated temperatures of 30° to 60° C. A further advantage of the binders according to the invention is that they may be reprocessed and reused by ultrafiltration.

In the following examples, all parts and percentages are by weight percentages unless otherwise indicated.

EXAMPLES

EXAMPLE 1

Production of Diol V) Containing Ester Groups

In a nitrogen-purged 100 liter vessel, 57.3 g of $\epsilon$-caprolactone, 12.7 kg of 1,6-hexanediol and 3.5 kg of tin-II-octoate were mixed together and heated to 160° C. After 4 hours at 160° C. the reaction was complete. After cooling, the batch (70 kg) was discharged. The product was fluid at room temperature.

Diol data:
Viscosity (25° C.): 330 mPa.s
OH number: 172.4
Acid number: 0.6
Hazen color index (Hazen) (DIN 53 409): 30
Average molecular weight (calculated from OH number): 650

Gel-chromatographic analysis provided the following oligomer distribution of the polyester:

| Oligomer (molecular weight) | Experimental (area % = weight %) |
| --- | --- |
| 118 | 0.15 |
| 232 | 1.75 |
| 246 | 5.76 |
| 460 | 11.44 |
| 574 | 15.92 |
| 688 | 19.19 |
| 802 | 15.62 |
| 916 | 12.08 |
| 1030 | 8.15 |
| 1144 | 5.25 |
| >1144 | 4.69 |

Result: More than 50 wt. % of the molecules contained in the polyester were within a molecular weight range of 460 to 802.

EXAMPLE 2

Polyisocyanate Mixture According to the Invention

Ingredients:
86.0 g of the ester diol from Example 1
14.7 g of dimethylolpropionic acid (DMPA)
4.5 g of trimethylolpropane
5.9 g of 1,6-hexanediol
131.0 g of 4,4'-dicyclohexylmethane diisocyanate
34.8 g of butanone oxime
9.8 g of dimethylaminoethanol (DMAE)
41.6 g of N-methylpyrrolidone (NMP)
462.0 g of deionized water Procedure:
The mixture of the polyols, DMPA and NMP was stirred together at approximately 50° C. with the diisocyanate and heated to 100° C. within an hour. After approximately 5 hours, an NCO content of 4.5% was reached (theoretical value 4.6). The oxime was then added such that a temperature of 110° C. was not exceeded during the exothermic reaction. The mixture was then stirred for 15 minutes, during which time the temperature was reduced to 90° to 95° C., DMAE was added and after a further 5 minutes the mixture was dispersed over a period of 15 minutes in water at approximately 80° C.

An almost clear solution was obtained having a solids content of 35%, a blocked NCO content of 1.6% and a viscosity of 5000 mPa.s/23° C. The product had a (blocked) NCO functionality of approximately 2.23.

EXAMPLE 3

Urethane-Modified Polyester Resin 267 g (3.1 mol %) of 1,2-propylene glycol, 5080 g (43.6 mol %) of neopentyl glycol, 1419 g (9.5 mol %) of trimethylolpropane, 3093 g (18 mol %) of phthalic anhydride and 4101 g (25.1 mol %) of isophthalic acid were weighed out into a 15 liter reaction vessel equipped with stirrer, cooler, heater and water separator. The mixture was heated to 220° C. and condensed with elimination of water until the acid number was 3.

8450 g of this polyester, 398 g of dimethylolpropionic acid and 100 g of neopentyl glycol were dissolved in 780 g of N-methylpyrrolidone, 10 g of dibutyltin dilaurate were added as catalyst and the mixture was heated to 75° C. After addition of 1150 g of hexamethylene diisocyanate, the temperature was raised to 125° C. with the heat generated by the exothermic reaction. Stirring was continued until no further NCO groups were detectable in the reaction mixture. 268 g of DMAE were then added and the product was dispersed in 11,270 g of water.

An approximately 45% solids dispersion was obtained having an organic solvent content of approximately 3.5%. The content of organically bound hydroxyl groups was 1.5% (based on the dispersion).

EXAMPLE 4

Urethane-Modified Polyester Resin 125 g of 1,2-butanediol, 1889 g of neopentyl glycol, 562 g of trimethylolpropane, 812 g of isophthalic acid, 616 g of maleic anhydride and 1034 g of phthalic anhydride were heated to 220° C. in a 10 liter stirred vessel equipped with stirrer, cooler, heater and water separator, and water was eliminated until the acid number was 3.

850 g of this polyester, 40 g of dimethylolpropionic acid and 0.7 g of dibutyltin oxide were dissolved in 60 g of N-methylpyrrolidone and reacted at 80° C. with a mixture of 95 g of hexamethylene diisocyanate and 10 g of a hexamethylene diisocyanate trimer (Desmodur N 3300, Bayer AG) until no free NCO groups were detectable. After addition of 23.8 g of methyldiethanolamine, the product was dispersed in 1130 g of water. An approximately 45% resin dispersion was obtained having an organic solvent content of approximately 2.7% and a hydroxyl group content of 1.7% (based on the dispersion).

EXAMPLE 5

Urethane-Modified Polyester Resin 509 g of peanut fatty acid, 1051 g of 1,6-hexanediol, 560 g of 1,4-cyclohexanedimethanol, 1093 g of adipic acid, 1243 g of isophthalic acid and 940 g of trimethylolpropane were weighed out into a 10 liter reaction vessel equipped with stirrer, cooler, heater and water separator, and esterified at 220° C. until the acid number was 5.

3540 g of this polyester and 330 g of dimethylolpropionic acid were dissolved in 700 g of N-methylpyrrolidone, 10 g of dibutyltin oxide were added and the mixture was reacted at 70° C. with 1000 g of isophorone diisocyanate. The reaction was continued at 70° to 110° C. until no NCO groups were detectable. After addition of 135 g of methyldiethanolamine, the resin was dispersed in 5100 g of water. An approximately 45% resin dispersion was obtained. The organic solvent content was 6.5%. The content of reactive hydroxyl groups bound to the polyester resin was 1.77%.

EXAMPLE 6

Urethane-Modified Polyester Resin 316 g of benzoic acid, 2316 g of trimethylolpropane, 2853 g of 1,6-hexanediol, 1602 g of 1,4-cyclohexanedimethanol, 3130 g of adipic acid, 2931 g of isophthalic acid and 300 g of dimeric fatty acid (Pripol 1008, Unichema) were weighed out into a 15 liter reaction vessel equipped with stirrer, cooler, heater and water separator and esterified at 210° C. until the acid number was 3.

1020 g of this polyester were dissolved together with 87 g of dimethylolpropionic acid in 2000 g of acetone at 60° C. After addition of 1.5 g of dibutyltin dilaurate as catalyst, 230 g of isophorone diisocyanate and 65 g of perhydrodiphenylmethane diisocyanate were added and the batch stirred at 60° C. until no free NCO groups were detectable. After addition of 35 g of dimethylethanolamine and 1600 g of water, the acetone was eliminated by distillation. An approximately 45% resin solution was obtained, which contained no organic solvent. The solution has a content of isocyanate-reactive hydroxyl groups of 1%.

EXAMPLE 7

Urethane-Modified Polyester Resin

A polyester resin containing hydroxyl groups was produced by the melt condensation of 38 parts of 1,6-hexanediol, 10.5 parts of trimethylolpropane and 47 parts of phthalic anhydride (temperature 210° C., until acid value=3). The resulting resin was then reacted with 11 parts of trimellitic anhydride at 120° C. for 2 hours. 95 parts of the resin containing carboxyl groups and OH groups were dissolved in 15 parts of butyl glycol. After 5 parts of dimethylethanolamine were added, an approximately 70% solution was prepared by the addition of 15 parts of water.

EXAMPLE 8

Stoving Composition According to the Invention 22.2 parts of the aqueous polyester from Example 3 and 50.2 parts of the aqueous blocked polyisocyanate from Example 2 were ground for 30 minutes in a bead mill at 2800 rpm and mixed with 15.1 parts of (rutile type) titanium dioxide, 0.1 parts of black iron oxide, 4.9 parts of barium sulphate and 2.1 parts of talcum. 0,5 parts of a commercial wetting agent (Additol XW 395, Vianova Hoechst, Vienna), 0,5 parts of a commercial levelling agent (Surfinol 104 E Air Products), 0,4 parts of an antisettling agent (Aerosil R 972, Degussa) and 3,9 parts of deionized water were added. The ratio of blocked NCO groups to organically bound hydroxyl groups was approximately 1:1.

EXAMPLE 9

Stoving Composition According to the Invention

The following constituents were ground in a bead mill using the same procedure as in Example 8:

| | |
|---|---|
| 22.3 | parts of the aqueous resin from Example 3 |
| 7.3 | parts of the aqueous resin from Example 6 |
| 41.5 | parts of the aqueous blocked polyisocyanate from Example 2 |
| 15.2 | parts of titanium dioxide |
| 4.9 | parts of barium sulphate |
| 2.1 | parts of talcum |
| 5.1 | parts of deionized water |
| 0.5 | parts of Additol XW 395 |
| 0.5 | parts of Surfinol 104 E |
| 0.4 | parts Aerosil R 972 |
| 0.2 | parts of dimethylethanolamine |

The ratio of blocked NCO groups to organically bound hydroxyl groups in the one-component stoving resin was approximately 0.7.

EXAMPLE 10

Comparison Example

This example sets forth the composition of an optimized filler binder according to the prior art. The ingredients were ground in a bead mill for 30 minutes at 2800 rpm. Ingredients:

| | |
|---|---|
| 33.7 | parts of the aqueous resin from Example 7 |
| 4.3 | parts of water-soluble hexamethoxymethyl melamine |
| 15.1 | parts of titanium dioxide |
| 0.1 | parts of black iron oxide |
| 4.9 | parts of barium sulphate |
| 2.1 | parts of talcum |
| 38.4 | parts of deionized water |
| 0,5 | parts of Additol XW 395 |
| 0,5 | parts of Surfinol 104 E |
| 0,4 | parts Aerosil R 972 |

EXAMPLE 11

Comparison Example

This example sets forth an aqueous, optimized filler binder according to the prior art, which was produced as stated in Example 10 from the following constituents:

| | |
|---|---|
| 24.8 | parts of the aqueous resin from Example 7 |
| 12.9 | parts of the aqueous resin from Example 5 |
| 3.3 | parts of a water-soluble hexamethoxymethyl melamine |
| 14.3 | parts of titanium dioxide |
| 0.1 | parts of black iron oxide |
| 4.6 | parts of barium sulphate |
| 2.0 | parts of talcum |
| 36.7 | parts of deionized water |
| 0,4 | parts of Additol XW 395 |
| 0,4 | parts of Surfinol 104 E |
| 0,4 | parts Aerosil R 972 |

EXAMPLE 12

Stoving Composition According to the Invention

The following constituents were mixed together by grinding in a bead mill as set forth in Example 8:

| | |
|---|---|
| 20.9 | parts of the aqueous resin from Example 3 |
| 6.7 | parts of the aqueous resin from Example 4 |
| 42.4 | parts of the aqueous blocked polyisocyanate from Example 2 |
| 14.9 | parts of titanium dioxide |
| 0.1 | parts of black iron oxide |
| 4.8 | parts of barium sulphate |
| 2.1 | parts of talcum |
| 6.7 | parts of deionized water |
| 0,5 | parts of Additol XW 395 |
| 0,5 | parts of Surfinol 104 E |
| 0,4 | parts Aerosil R 972 |

The ratio of blocked NCO groups to organically bound hydroxyl groups in the one-component stoving resin was approximately 0.7.

EXAMPLE 13

Use of Preceding Coating Compositions

The aqueous stoving compositions from Examples 8, 9, 10, 11 and 12 were adjusted with deionized water to a viscosity of approximately 30 s flow time from a DIN-cup 4 mm/23° C. The compositions were then sprayed using a gravity feed spray gun at an air pressure of 5 bar at 65% relative humidity/23° C. onto zinc phosphatized steel sheets which had previously coated with a cathodically deposited primer (approximately 20 μm).

After 10 minutes ventilation in a circulating air oven at 23° C., the filler was hardened for 10 minutes at 75° C. and then 20 minutes at 165° C. The dry film thickness was approximately 35 μm.

The filler was then coated with either topcoat a) or topcoat b). For topcoat a), an alkyd/melamine based, commercial automotive topcoat having a dry film thickness of approximately 35 μm, was applied on top of the filler layer and dried for 30 minutes at 130° C. For topcoat b), an aqueous, colored base coat having a dry film thickness of approximately 20 μm was applied followed after 10 minutes at 80° C. by a 2-component polyurethane clear top coat (35 μm dry film). The coatings were then baked for 30 minutes at 130° C.

The important test results for the fillers are set forth in Table 1. The properties which are not set forth, such as example solvent resistance, water resistance and salt spray resistance, completely fulfil practical requirements.

TEST METHODS

Topcoat Appearance

The gloss and surface appearance of the topcoat on the various fillers was subjectively evaluated according to optical values in % (100=very good, 0=very poor). Resistance to stone impact The following test equipment was used a) Stone impact tester from VDA (from Erichsen, model 508), shot twice, each time with 500 g of steel shot (angular, 4–5 mm) at an air pressure of 1.5 bar at 23° C. Comparisons were made relating to topcoat adhesion (1–3, 1=very good adhesion, 3=delamination between topcoat and filler) and penetration down to the sheet metal (0–10, 0=no penetration, 10=numerous penetrations).

b) Stone impact tester from Mercedes-Benz type 490 at 23° C. and −20° C. Evaluations were made in relation to topcoat adhesion (1–3) and penetration down to the sheet metal in mm².

TABLE 1

| Example | Comp. 10 | Comp. 11 | 8 | 9 | 12 |
|---|---|---|---|---|---|
| Topcoat Appearance | | | | | |
| a) | 80% | 80% | 80% | 80% | 80% |
| b) | 90% | 90% | 90% | 90% | 90% |
| VDA stone impact Penetration | | | | | |
| a) | 1-2 | 1 | 0 | 0 | 0 |
| b) | 2 | 2 | 0 | 0 | 0 |
| Topcoat adhesion | | | | | |
| a) | 1-2 | 2 | 1 | 1 | 1 |
| b) | 2 | 2-3 | 1 | 1 | 1 |
| MB 490 stone impact Penetration 23° C./−20° C. | | | | | |
| a) | 0/1 | 0/0 | 0/0 | 0/0 | 0/0 |
| b) | 3/3 | 2/2 | 0/0 | 0/0 | 0/0 |
| Topcoat adhesion 23° C./−20° C. | | | | | |
| a) | 1/2 | 1/2 | 1/1 | 1/1 | 1/1 |
| b) | 2/2 | 2/2-3 | 1/1 | 1/1 | 1/1 |
| Filler on steel sheet | | | | | |
| Erichsen indentation (DIN 53 156) | 7.5 | 8 | 10 | 10 | 10 |
| Cross cutting (DIN 53 151) | Gt0 | Gt0 | Gt0 | Gt0 | Gt0 |
| Filler on glass sheet | | | | | |
| Pendulum hardness (DIN 53 157) | 124 s | 87 s | 129 s | 125 s | 130 s |

Topcoat a) (alkyd/melamine)
Topcoat b) (2 layer polyurethane)

*SUMMARY OF RESULTS

The results in Table 1 demonstrate that Examples 8, 9 and 12 were superior to both Comparison Examples 10 and 11. Most apparent was the combination of high hardness and good elasticity. Adhesion to the topcoat was also significantly better in the examples according to the invention.

EXAMPLE 14

Crosslinking Resin According to the Invention

The following ingredients were used to prepare a crosslinking resin according to the procedure described in

EXAMPLE 2

71.5 parts of the ester diol from Example 1
8 parts of trimethylolpropane
10 parts of dimethylolpropionic acid
5.9 parts of 1,6-hexane diol
111 parts of isophorone diisocyanate
24.1 parts of N-methylpyrrolidone
34.8 parts of butanone oxime
6.7 parts of dimethylethanolamine (DMEA)
417 parts of deionized water The resulting blocked polyisocyanate was an almost clear, 35% solution (DMAE was calculated as solvent) having a viscosity of 9000 mPa.s/23° C. The blocked NCO content was 2.0; the (blocked) NCO functionality was 2.41.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate mixture which has blocked isocyanate groups and an average NCO-functionality, based on reversibly blocked isocyanate groups, of 2.0 to 2.6, and comprises the reaction product, converted into the salt form by the at least partial neutralization of the incorporated carboxyl groups, of
   i) at least one organic diisocyanate having a molecular weight of 168 to 300 with
   ii) at least one monofunctional blocking agent for isocyanate groups,
   iii) at least one monobasic or dibasic hydroxycarboxylic acid,
   iv) 1 to 15 wt. %, based on the weight of component i), of at least one dihydric to hexahydric alcohol having a molecular weight of 62 to 182 and
   v) 50 to 500 wt. %, based on the weight of component i), of at least one diol having a molecular weight of 350 to 950 and containing ester groups.

2. The polyisocyanate mixture of claim 1 wherein in that component v) consists essentially of an adipic acid polyester diol.

3. The polyisocyanate mixture of claim 1 wherein component v) consists essentially of a polycaprolactone diol.

4. The polyisocyanate mixture of claim 3 wherein said polycaprolactone diol is the reaction product of ε-caprolactone with 1,6-dihydroxyhexane and contains at least 50 wt. % of polycaprolactone diols having a molecular weight of 460 to 802.

5. An aqueous stoving composition which comprises a) a water dispersible or water soluble polyhydroxyl compound and b) a polyisocyanate mixture which has blocked isocyanate groups and an average NCO-functionality, based on reversibly blocked isocyanate groups, of 2.0 to 2.6, and comprises the reaction product, converted into the salt form by the at least partial neutralization of the incorporated carboxyl groups, of i) at least one organic diisocyanate having a molecular weight of 168 to 300 with ii) at least one monofunctional blocking agent for isocyanate groups, iii) at least one monobasic or dibasic hydroxycarboxylic acid, iv) 1 to 15 wt. %, based on the weight of component i), of at least one dihydric to hexahydric alcohol having a molecular weight of 62 to 182 and v) 50 to 500 wt. %, based on the weight of component i), of at least one diol having a molecular weight of 350 to 950 and containing ester groups.

6. The aqueous stoving lacquer of claim 5 wherein the water dispersible or water soluble polyhydroxyl compound a) comprises a urethane-modified polyester resin which has an acid number of 12 to 30, a hydroxyl number of 30 to 130 and a solvent content below 5.5 wt. % and comprises the reaction product of a1) 81 to 92 wt. % of a polyester polyol which has a hydroxyl number of 80 to 210 and an acid number of ≦5, and comprises the condensation product of a1.1) 35 to 50 mol % of one or more diprimary diols having a molecular weight of 62 to 150, a1.2) 1 to 7 mol % of one or more primary/secondary diols having a molecular weight of 76 to 286, a1.3) 36 to 50 mol % of one or more dicarboxylic acids having a molecular weight of 98 to 600, a1.4) 4 to 14 mol % of one or more triols having a molecular weight of 92 to 134 and a1.5) 0 to 4 wt. % of one or more monocarboxylic acids having a molecular weight of 122 to 280, a2) 3 to 6.5 wt. % of a bis(hydroxymethyl)alkane-carboxylic acid, a3) 0 to 5 wt. % of a low molecular weight diol or triol having a molecular weight of 62 to 150 and a4) 7 to 14.5 wt. % of a polyisocyanate component, at least 60% of which is a linear aliphatic polyisocyanate having a molecular weight of 168 to 1000, wherein said reaction product is prepared in an at least 90% organic solution followed by conversion of at least 75% of the carboxyl groups into carboxylate groups and dispersion in water.

7. The aqueous stoving composition of claim 5 wherein in that component v) consists essentially of an adipic acid polyester diol.

8. The aqueous stoving composition of claim 6 wherein in that component v) consists essentially of an adipic acid polyester diol.

9. The aqueous stoving composition of claim 5 wherein component v) consists essentially of a polycaprolactone diol.

10. The aqueous stoving composition of claim 6 wherein component v) consists essentially of a polycaprolactone diol.

11. The aqueous stoving composition of claim 9 wherein said polycaprolactone diol is the reaction product of ε-caprolactone with 1,6-dihydroxyhexane and contains at least 50 wt. % of polycaprolactone diols having a molecular weight of 460 to 802.

12. The aqueous stoving composition of claim 10 wherein said polycaprolactone diol is the reaction product of ε-caprolactone with 1,6-dihydroxyhexane and contains at least 50 wt. % of polycaprolactone diols having a molecular weight of 460 to 802.

* * * * *